United States Patent [19]
Hoshino et al.

[11] Patent Number: 5,341,131
[45] Date of Patent: Aug. 23, 1994

[54] COMMUNICATIONS SYSTEM AND A SYSTEM CONTROL METHOD

[75] Inventors: Masakazu Hoshino, Tamamura; Tetsuo Sato, Takasaki, both of Japan

[73] Assignees: Hitachi, Ltd.; Hitachi Microcomputer System Ltd., Tokyo, Japan

[21] Appl. No.: 853,922

[22] Filed: Mar. 19, 1992

[30] Foreign Application Priority Data

Mar. 29, 1991 [JP] Japan ................... 3-091737

[51] Int. Cl.⁵ ............................. G08C 19/16
[52] U.S. Cl. .................. 340/825.21; 340/825.25; 340/825.57; 340/825.62; 340/825.65; 370/85.11
[58] Field of Search ............ 340/825.21, 825.24, 340/825.25, 825.65, 825.57, 825.62; 370/85.11, 101; 375/107, 111

[56] References Cited

U.S. PATENT DOCUMENTS

| | | | |
|---|---|---|---|
| 3,588,709 | 6/1971 | Hoyler | 370/101 |
| 4,156,112 | 5/1979 | Moreland | 370/101 |
| 4,689,740 | 8/1987 | Moelands et al. | 364/200 |

*Primary Examiner*—Michael Horabik
*Attorney, Agent, or Firm*—Fay, Sharpe, Beall, Fagan, Minnich & McKee

[57] ABSTRACT

In a communications system having a plurality of stations interconnected by a two-line circuit, in which the two-line circuit consists of a data bus circuit for transmitting a series of data bits between at least one sending station and at least one receiving station of the plurality of stations and a clock bus circuit for transmitting clock signals in synchronism with each of the data bits; the data bus circuit sends a signal or a command requesting the receiving station to enter a standby or an execute state after taking in data supplied, while a logic value on the clock bus circuit is fixed. In more detail, the sending station transmits signals to make at least one of the receiving stations enter the standby state after taking in data and then sends data to another receiving station, after which the sending station sends a signal or command to make both the first and second receiving stations simultaneously enter the execute state. The signal or command requesting the standby or execute state is added at the end of a data packet containing a series of data. The data packet includes data to be transferred to the receiving station and an address of the receiving station.

25 Claims, 5 Drawing Sheets

COMMUNICATIONS SYSTEM AND A SYSTEM CONTROL METHOD

BACKGROUND OF THE INVENTION

The present invention relates to a serial data communications system and a system control method and more particularly to a technique that can be effectively applied to such systems as video tape recorders (simply referred to as VTRs), video disc players (VDPs), compact disc players, digital audio tape recorders (DATs) and television sets (TVs), which have various servo control ICs (integrated circuits) and many signal processing ICs and in which multiple operations are initiated simultaneously by means of mode specification.

Known communications systems that perform the serial data communication by two-wire circuit include Japan Patent Publication No. 65178/1988 (equivalent U.S. Pat. No. 4,689,740, European Patent No. 51332, and South Korea Patent No. 8801017). This system employs a two-line circuit consisting of a clock line for supplying clock signals and a data line for supplying data. In a normal data transfer, the data signal transition is allowed only during the low state of the clock, except that a "start signal" and an "end signal" are made to change their states during the high-state period of the clock.

The inventors have found the following.

When a plurality of receiving stations connected to the same bus line are to be controlled individually by using addresses, what always matters is a simultaneity of controls. This is an important issue with VTR and VDP where the mechanical control and the signal processing are closely related with each other.

When, in VTR for example, the mode is to be switched from a playback mode to a record mode, the operation mode of the video signal processing IC is switched from the playback mode to the record mode. At this time, to prevent the switching noise from being recorded on the magnetic tape, it is necessary to mute the video signal processing IC. At the same time, a playback preamplifier is stopped or deenergized, the record amplifier is energized, and a head switch is operated accordingly. The servo system control IC must change the phase/speed control of capstan and drum from the playback to the record mode. The audio signal processing IC is also switched in the operation mode from the playback to the record mode. To prevent abnormal noise from occurring during the transient state, the audio signal processing IC must be muted.

These controls are supposed to be initiated simultaneously, rather than being performed sequentially as in the conventional serial data transfer method. In the conventional method, as the data transfer speed is increased, the simultaneity of controls tends to improve. However, this calls for a device capable of high-speed operation, which in turn pushes up the overall cost of the data processing system. An increased speed of the data transfer has another drawback of easily producing high frequency interferences.

SUMMARY OF THE INVENTION

An object of this invention is to provide a serial data communications system and a system control method which are capable of improving the simultaneity of controls.

Another object of the invention is to provide a data processing system that can utilize the serial data communications system which has improved simultaneity of controls.

These and other objects and novel features of this invention will become apparent from the following description and the accompanying drawings in the specification.

Representative inventions disclosed in this application may be briefly summarized as follows. In a communications system having a plurality of stations interconnected by a two-line circuit—which consists of a data bus circuit for transmitting a series of data bits between at least one sending station and at least one receiving station of the plurality of stations and a clock bus circuit for transmitting synchronous clock signals in synchronism with each of the data bits—the data bus circuit sends a signal, information or command requesting the receiving station to enter a standby state after taking in data supplied or to execute the data, while a logic value (voltage value) on the clock bus circuit is fixed. For example, the sending station transmits signals to make at least one of the receiving stations enter the standby state after taking in data and then sends data to another receiving station, after which the sending station sends a signal, information or command to make both the first and second receiving stations simultaneously enter the execute state. The signal, information or command requesting the standby or execute state is added at the end of a data packet containing a series of data. The data packet includes data to be transferred to the receiving station and an address of the receiving station.

In more detail, in the communications system of this invention each receiving station includes means to distinguish between a command for temporarily holding data received whose address corresponds to the receiving station and a command for executing the data in order to achieve the simultaneity of operations among the plurality of receiving stations. The sending station can send out the data hold command as many times as needed. The execute command sent later from the sending station causes all the receiving stations, that are holding data supplied and are standing by, to simultaneously enter the execute state. To achieve such a communications system, a serial data output terminal of the serial data output port and one output terminal of the general port in a microcomputer, which works as a sending station, are wired-ORed. With this circuit, the central processing unit (CPU) of the microcomputer can send a series of data (command) requesting the standby state or execute state onto the serial data output terminal by writing the series of data into a data output register in the general port. The receiving stations include a means to distinguish between a series of data (command) requesting the standby state and a series of data (command) requesting the execute state, these data being supplied from the microcomputer that acts as a sending station.

A two-line data bus scheme is employed in which one of the line carries a clock signal and the other data. In a data transfer state, the data signal transition occurs at the reversed edge (for example, the raising edge) of the read-in edge (for example, the falling edge) of the clock. At the end of the data packet the clock line is fixed to, for example, a high voltage level to allow voltage transition of the data signal on the data line. The number of data signal transitions (number of pulses) when the clock line is kept at a fixed voltage is taken to be the information that determines the state of the receiving station. That is, the number of data line transitions (pulses) when the clock line is set to a fixed voltage determines whether the receiving station should go to a standby state or an execute state. The receiving station counts the number of transitions (pulses) to find out whether it should be set to the standby state or the execute state. The signal requesting the standby state is effective only for the receiving station that is specified by the address. The signal requesting the execute state is effective for all the receiving stations connected to the data bus.

The communications system representative of this invention assures simultaneity of the data execution among the receiving stations by making the sending station first send to the receiving stations a standby data (command) requesting an individual receiving station to enter a standby mode and then send an execute data (command) requesting all the receiving stations to simultaneously enter the execute mode.

DESCRIPTION OF THE PREFERRED EMBODIMENTS

Figure 1:
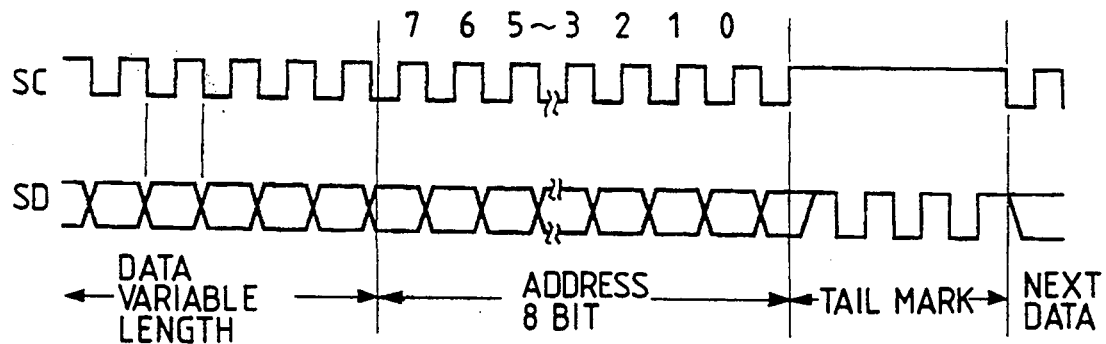
FIG. 1 is a format diagram showing one example of serial data in a communications system embodying this invention.

FIG. 1 is a format diagram showing one example of serial data in a communications system according to this invention.

The format in the figure represents the voltage states of a sending clock SC on the clock line and sending data SD or serial data on the data line. In other words, this communications system employs a so-called two-line circuit in which the clock SC is transmitted on the clock line (clock pulse circuit) and the serial data SD on the data line (data bus circuit). One packet of information consists of serial data DATA whose data length is variable, 8 bits or 16 bits, an 8-bit address ADDRESS, and a tail mark TAIL.MARK attached at the end of the packet. Except for the tail mark TAIL.MARK, the information packet has a specification compatible with the serial port of the existing microcomputer.

The transition of data DATA and address ADDRESS is synchronized with the high-to-low trailing edge of the clock SC. At the low-to-high leading edge of the clock SC the data DATA and the address ADDRESS have already been established. The tail mark TAIL.MARK is an exception. It is allowed to change its voltage level on the data line even when the clock SC is on the fixed high level.

Figure 2:
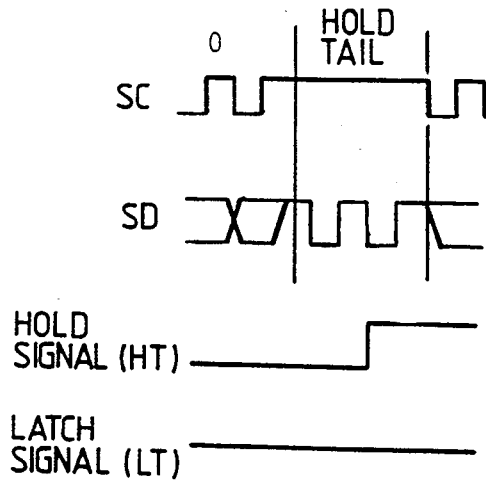
FIG. 2 is a timing diagram showing an example of a hold tail provided at the end of the serial data.
Figure 3:
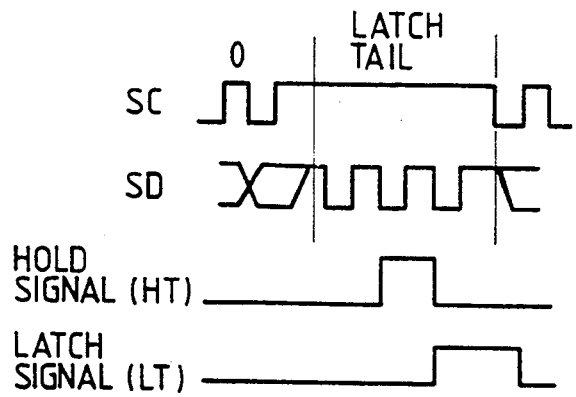
FIG. 3 is a timing diagram showing an example of a latch tail provided at the end of the serial data.

The tail mark TAIL.MARK is given two different meanings, a hold tail HOLD.TAIL of FIG. 2 and a latch tail LATCH.TAIL of FIG. 3.

The hold tail HOLD.TAIL shown in FIG. 2 is defined to have, for example, two high-to-low transitions (one pulse) on the data line when the clock SC is high. The hold tail HOLD.TAIL represents information that tells a receiving station to go to a standby state after taking in data DATA. Hence, the receiving station specified by the address ADDRESS, when it recognizes the reception of the hold tail HOLD.TAIL, holds the data DATA received without executing it.

The latch tail LATCH.TAIL shown in FIG. 3 is defined to have, for example, three high-to-low transitions (two pulses) on the data line when the clock SC is high. The latch tail LATCH.TAIL is information that tells a receiving station to execute data DATA received. Hence, the receiving station specified by the address ADDRESS, when it recognizes the reception of the latch tail LATCH.TAIL, executes the data DATA already taken in.

The data DATA preceding the address ADDRESS is regarded as a mode change command (or mode change information or mode change data) calling for a state change in the receiving station. Therefore, executing the data DATA by the receiving station means changing the state of the receiving station.

While in the above description, the hold tail HOLD.TAIL and the latch tail LATCH.TAIL are defined as having two and three high-to-low potential transitions on the data line, respectively, it is easily understood that they can be changed as required.

Further, only two tail marks, hold tail HOLD.TAIL and latch tail LATCH.TAIL, are described, it is possible to add other kinds of tail marks as required. For example, when information calling for data transfer is newly added, a tail mark requesting the data transfer need be defined to have four high-to-low potential transitions on the data line.

Defining a new tail mark as having only one high-to-low transition on the data line should be avoided. This is because where there is a possibility of noise being applied to the data line and lowering its potential, the high-to-low transition of the data line potential caused by noise may be mistaken for the new tail mark.

Figure 4:
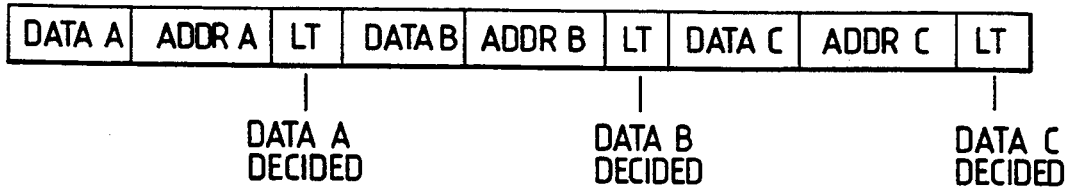
FIG. 4 is an example of data transfer as performed by the communications system of this invention.
Figure 5:
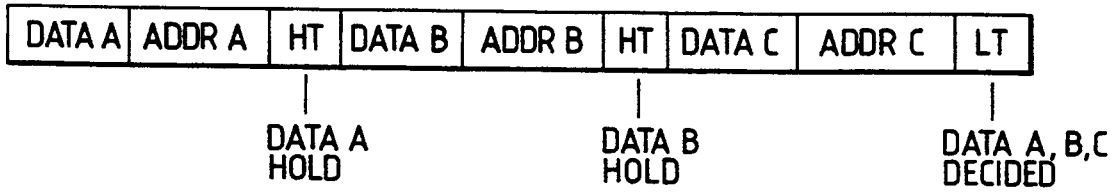
FIG. 5 is another example of data transfer as performed by the communications system of this invention.

FIGS. 4 and 5 show examples of data transfer utilizing tail marks of FIGS. 2 and 3.

FIG. 4 shows an example of data transfer performed when the receiving stations. (station A-C) sequentially execute the serial data in response to the reception of the latch tail LATCH.TAIL.

The station A receives data DATAA and address ADDA successively and recognizes from the address ADDA that it is selected. Then in response to the latch tail LATCH.TAIL received next, the station A executes the data A. At this tee, station B and C also receive the data DATAA and address ADDA successively and they recognize from the address ADDA that they are not selected, so that when the latch tail LATCH.TAIL is received, they do not execute the data DATAA.

After this, the station B receives data DATAB and address ADDB and recognizes from the address ADDB that it is selected, so that when it receives the latch tail LATCH.TAIL, it executes the data DATAB. At this time, the station A and C also receive the data DATAB and address ADDB successively. They find from the address ADDB that they are not addressed and hence do not execute the data DATAB when the latch tail LATCH.TAIL is received.

Then, the station C receives data DATAC and address ADDC successively. It recognizes from the address ADDC that it is selected and, when the latch tail LATCH.TAIL is received next, executes the data DATAC. At this tithe, the station A and B also receive data DATAC and address ADDC successively, but recognize from the address ADDC that they are not chosen and therefore do not execute the data DATAC when the latch tail LATCH.TAIL is received.

FIG. 5 shows an example of data transfer performed when the receiving stations (station A-C) hold data successively in response to the hold tail HOLD.TAIL received and, upon reception of the latch tail LATCH.TAIL at the last, simultaneously execute the data.

The station A receives data DATAA and address ADDA in that order and recognizes from the address ADDA that it is selected. In response to the hold tail HOLD.TAIL received next, the station A holds the execution of the data DATAA. At this time, the station B and C successively receive data DATAA and address ADDA. From address ADDA, they find out that they are not chosen and hence neither execute nor hold the data DATAA when the hold tail HOLD.TAIL is received.

Then, the station B receives data DATAB and address ADDB in that order. It recognizes from the address ADDB that it is addressed and hence holds the execution of data DATAB in response to the hold tail HOLD.TAIL received next. At this time, the station A and C similarly receive the data DATAB and address ADDB but recognize from the address ADDB that they are not addressed and therefore neither execute nor hold the data DATAB when the hold tail HOLD.TAIL is received.

Then, the station C receives data DATAC and address ADDC and finds from the address ADDC that it is selected. Hence, when it receives the latch tail LATCH.TAIL next, the station C executes the data DATAC. At this time, in response to the latch tail LATCH.TAIL received, the station A and B also execute the data DATAA and DATAB that has been held.

This control will become apparent from the explanation of FIG. 8 described later. In FIG. 5, if the station A and B do not have a data hold function, the data DATAA and DATAB is executed successively.

Figure 6:
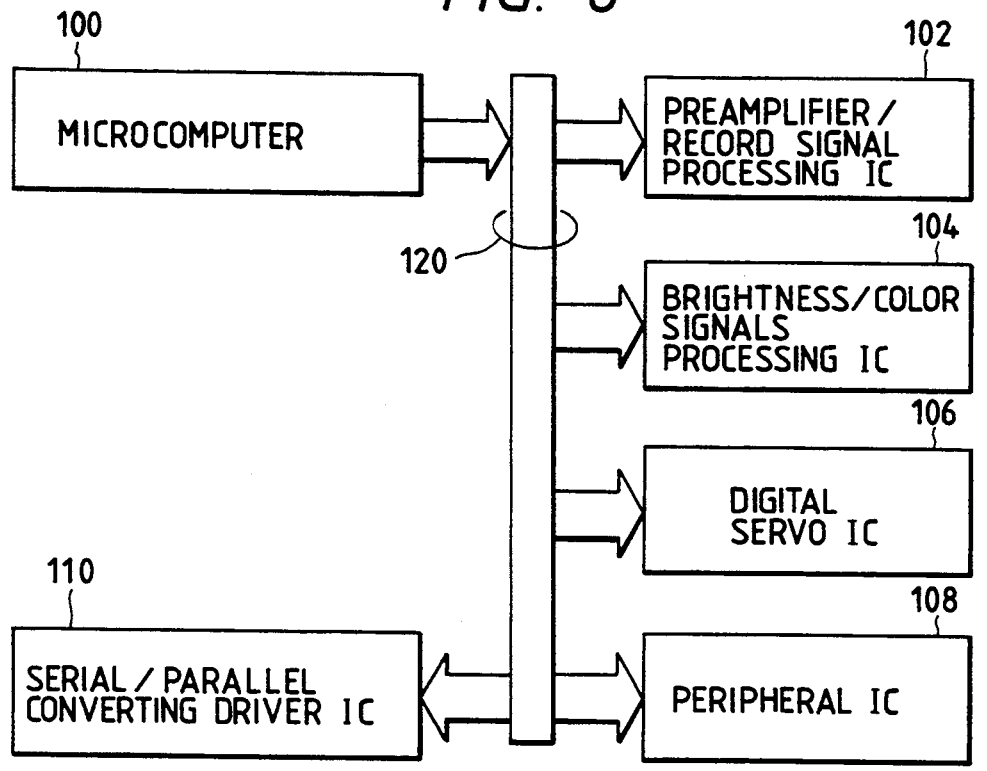
FIG. 6 is a block diagram of a VTR system that applies this invention.

FIG. 6 shows a system block diagram as one embodiment of a VTR that applies the serial communications system of this invention.

A microcomputer 100 which controls the system according to the program generates, as necessary, clock, data, address and tail mark that were described by referring to FIGS. 1 to 5, and works as a sending station that outputs them to receiving stations. One example method of generating the tail mark using the microcomputer 100 will be explained in detail by referring to FIG. 7.

A bus 120 includes one clock line that carries the transfer clock SC and one data line that carries the serial data SD.

Semiconductor integrated circuit devices 102, 104, 106, 108, 110 are electrically connected through the bus 120 to the microcomputer 100 and constitute receiving stations that receive the clock, data, address and tail mark output from the microcomputer 100 through the bus 120. The device 102 is a preamplifier and record signal processing IC; 104 a brightness/color signal processing IC; 106 a digital servo IC; 108 a peripheral IC; and 110 a serial/parallel converting driver IC, which will be detailed later.

In the VTR system shown in the figure, when the operation modes of the IC 102, 104, 106 are to be switched to the record mode from the playback mode simultaneously, the microcomputer 100 outputs the data format shown in FIG. 5 onto the bus 120. That is, with the IC 102, 104, 106 considered to correspond to the station A, B, C, respectively, the microcomputer 100 outputs the data, address and tail mark as follows.

The microcomputer 100 outputs data DATAA for changing the operation mode of the IC 102 to the record mode, an address ADDA specifying the IC 102, and a hold tail HOLD.TAIL in that order. The IC 102 receives the data DATAA and address ADDA and, from the address ADDA, becomes aware that it is selected. Then, in response to the hold tail HOLD.TAIL received next, the IC 102 holds the execution of the data DATAA. At this time, IC 104 and 106 also receive the data DATAA and the address ADDA but find from the address ADDA that they are not addressed and therefore neither execute nor hold the data DATAA when they receive the hold tail HOLD.TAIL.

After this, the microcomputer successively outputs data DATAB for changing the operation mode of IC 104 to the record mode, an address ADDB specifying the IC 104, and a hold tail HOLD.TAIL. The IC 104 receives the data DATAB and address ADDB in that order and, based on the address ADDB, finds that the IC 104 is chosen, so that when the hold tail HOLD.TAIL is received next, the IC holds the execution of the data DATAB. At this time, the IC 102 and 106 also receives the data DATAB and address ADDB but recognize from the address ADDB that they are not addressed, so that when the hold tail HOLD.TAIL is received, they neither execute nor hold the data DATAB.

Then, the microcomputer 100 outputs data DATAC for changing the operation mode of the IC 106 to the record mode, an address ADDC specifying the IC 106, and a latch tail LATCH.TAIL in that order. The station C receives the data DATAC and address ADDC and, from the address ADDC, recognizes that it is addressed. Hence, in response to the latch tail LATCH.TAIL received next, the station C executes the data DATAC. At this time, the IC 102 and IC 104, in response to the latch tail LATCH.TAIL received, execute the held data DATAA and data DATAB.

As a result, the operation modes of IC 102 to 106 are switched from the playback mode to the record mode simultaneously.

As shown in this embodiment, the microcomputer 100 can treat an electric system and a mechanical drive system as one system and control them synchronously. In addition, the microcomputer 110 is not required to have high speed operation for synchronization, has no problem with the data transfer interruption, and requires no processing for determining the priority of the data to be transferred. All this facilitates the manufacture of software program for the microcomputer 100.

Figure 7:
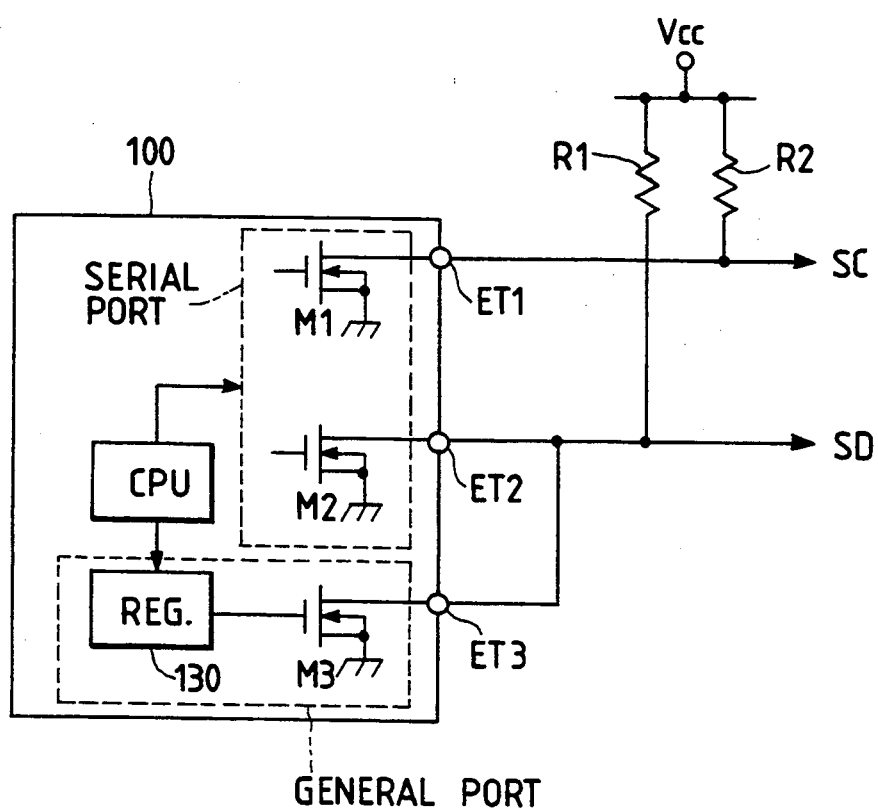
FIG. 7 is a circuitry showing one example of an interface on the sending side of the communications system of the invention.

FIG. 7 shows one example circuitry of a drive circuit on the sending side of the communications system according to this invention.

As shown in the figure, one output terminal of the serial data output port SERIAL.PORT and one output terminal of the general port GENERAL.PORT are wired-ORed. With this drive circuit, the central processing unit (CPU) of the microcomputer 100 can put the hold tail HOLD.TAIL or latch tail LATCH.TAIL on the serial data line SD by writing into a data output register 130 in the general port data corresponding to the hold tail HOLD.TAIL that calls for data holding or data corresponding to the latch tail LATCH.TAIL that calls for data execution.

As shown in the figure, the output transistor of the serial port SERIAL.PORT is formed of open-drain n-channel MOSFETs (insulated gate type field-effect transistors) M1 and M2. The output transistor of the general port is formed of an open-drain n-channel MOSFET M3. Since the drains of the MOSFETs M2 and M3 are drawn out from the chip as external output terminals ET2 and ET3, these external output terminals ET2 and ET3 are connected outside the chip to readily realize the wired-OR logic. Thus, the hold tail HOLD.TAIL and latch tail LATCH.TAIL can be sent on the data line (bus circuit) SD through the serial port of the microcomputer 100 without requiring the port switching by software.

The data line (data bus circuit) SD and the clock line (clock bus circuit) SC are, as shown, connected to a voltage source Vcc of say 5 volt through pull-up resistors R1, R2. Hence, the potentials of the data line SD and the clock line SC are set to that of the voltage source Vcc, say 5 volt, after the address and clock signals are output.

Figure 8:
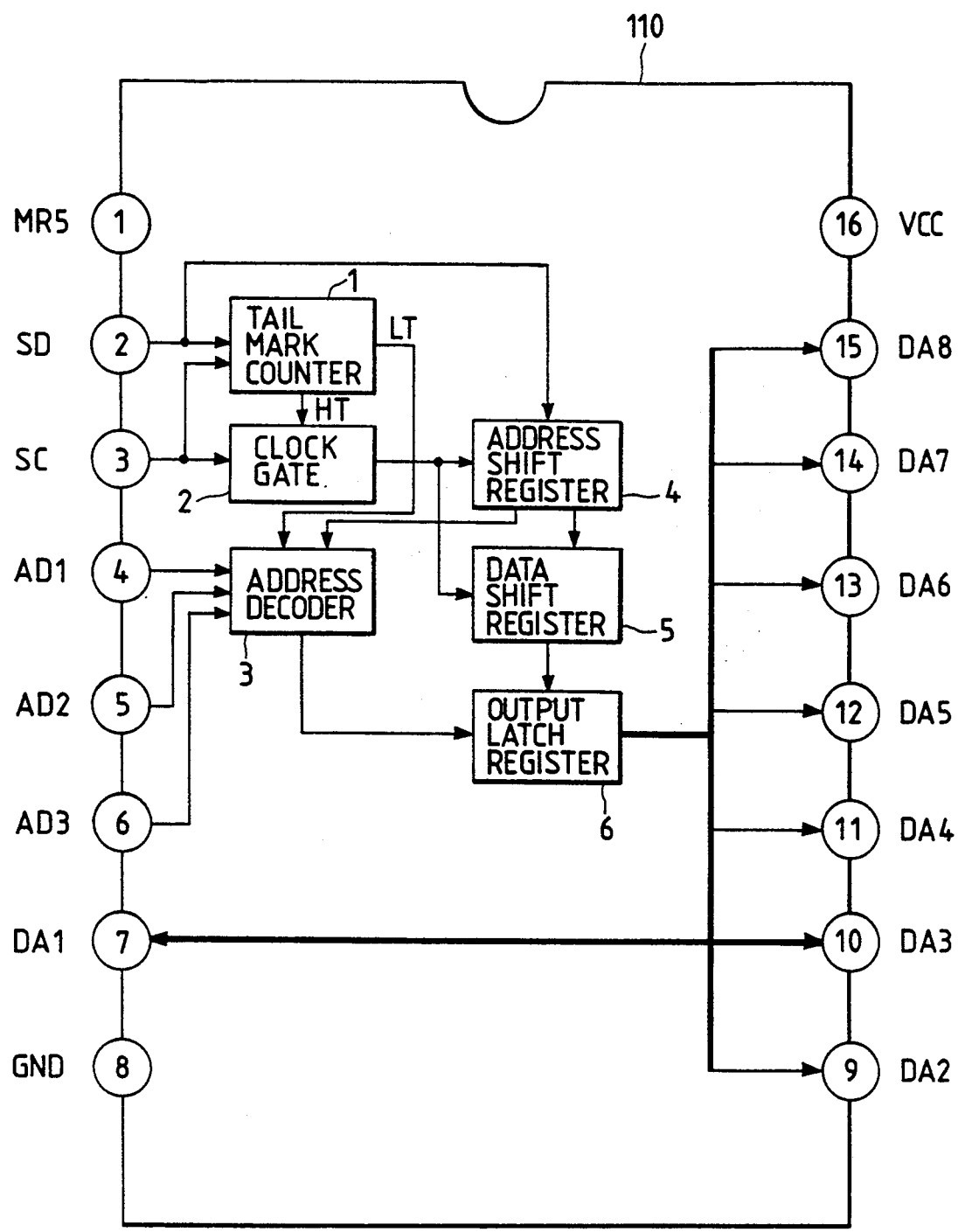
FIG. 8 is a block diagram of one example of a serial/parallel conversion driver IC provided on the receiving station side of the communications system of the invention.

FIG. 8 shows one example block diagram of a serial/parallel converting driver IC 110 provided on the receiving station side of the communications system of this invention.

In the figure, designated 1 is a tail mark counter which identifies the kind of the tail mark, i.e., checks if the signal at the end calls for data holding or data execution. Denoted 2 is a clock gate that closes the gate after receiving the hold data to protect the data. An address decoder 3 generates an address from input information (3 bits of OV/5 V binary signal) at terminal 4 to terminal 6. It is therefore possible for one chip to set eight kinds of addresses. The address decoder 3 compares the input data address with the set address. The input information at terminals 4–6 is determined by whether each terminal 4–6 is connected to OV or 5 V at time of system assembly.

Denoted 4 is an address shift register that picks up an address ADDRESS of the input data SD. A data shift register 5 picks up data DATA of the input data SD. An output latch register 6 outputs data DATA to the output terminals 7, 9–15 (DA1–DA8). Denoted 8 is a ground terminal GND, 16 a power source terminal Vcc, and 1 a terminal for resetting the registers 4, 5, 6 when power is turned on.

The operation of the serial/parallel converting driver IC is as follows. When the data SD is entered to the terminal 2 and the clock SC to the terminal 3, data is taken into the address shift register 4 and the data shift register 5.

When the tail mark TAIL.MARK is detected, a comparison is made between the contents of the address shift register 4 and the address decoder 3. When they agree and the tail mark TAIL.MARK is a hold tail HOLD.TAIL, then the hold signal HT is set high as shown in FIG. 2, closing the gate 2 and holding the data in the data shift register 5.

When on the other hand the contents of the address shift register 4 and the address decoder 3 agree and the tail mark TAIL.MARK is a latch tail LATCH.TAIL, the latch signal LT is set high as shown in FIG. 3, transferring the contents of the data shift register 5 to the output latch register 6 and parallelly outputting data DA1–DA8 from the terminals 7, 9–15.

When the contents of the address shift register 4 and the address decoder 3 do not agree, the serial/parallel converting driver IC does not take in the tail mark TAIL.MARK or hold tail HOLD.TAIL. Even under the data holding state the tail mark counter 1 is operating and when the latch command (latch tail LATCH.TAIL) is entered, the latch signal LT is set high to transfer the contents of the data shift register 5 to the output register 6 and parallelly output data D1–D8 from terminals 7, 9–15.

The above description has dealt with the serial/parallel converting driver IC 110. The input stage of the IC 102, 104, 106, 108 shown in FIG. 6 includes the circuitry of FIG. 8 consisting of the tail mark counter 1, clock gate 2, address decoder 3, address shift register 4, data shift register 5 and output latch register 6. It is easily understood that the output of the output latch register 6 is supplied to the input of the mode control circuit of each IC 102, 104, 106, 108.

Figure 9:
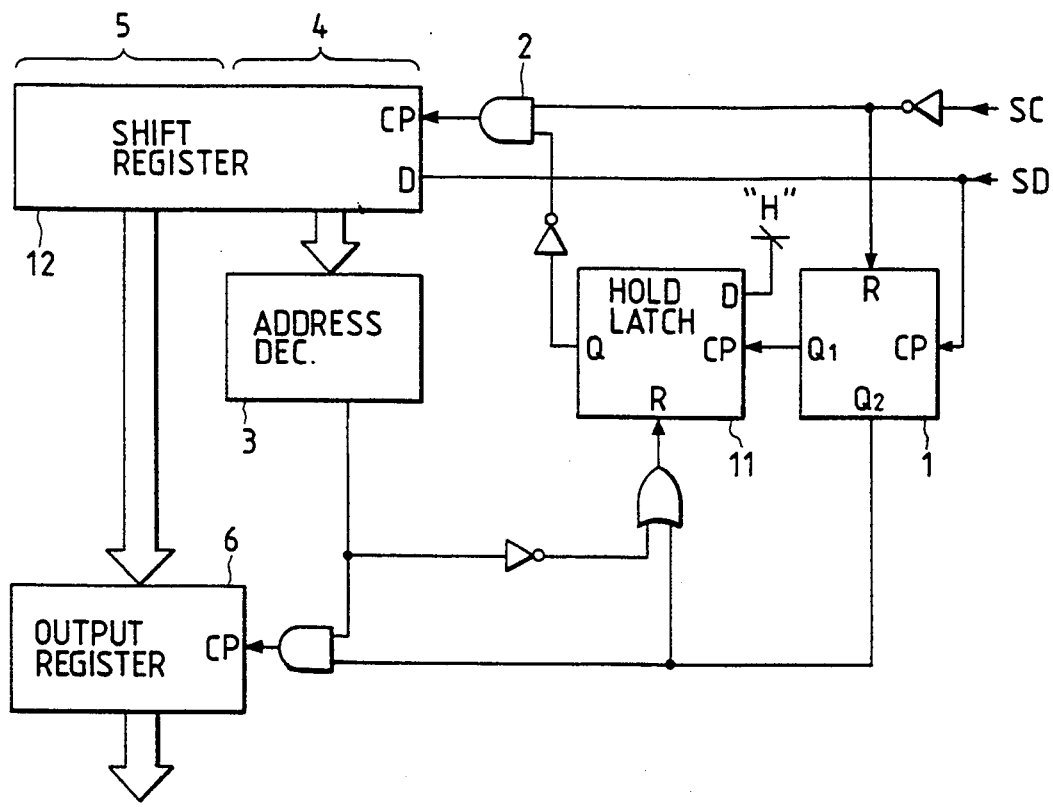
FIG. 9 is a circuitry showing one example of an interface on the receiving side of the communications system of the invention.

FIG. 9 shows more detailed circuitry of the tail mark counter 1, clock gate 2, address decoder 3, address shift register 4, data shift register 5 and output latch register 6 as well as the input stage of the IC 102, 104, 106,

The tail mark counter 1 counts the high-to-low transitions of the data SD when the clock SC is high. It is reset when the clock SC goes low. When the tail mark counter 1 counts two high-to-low transitions of the data SD (hold tail HOLD.TAIL) when the clock SC is high, it makes its output Q1 low. When it counts three high-to-low transitions of data SD (latch tail LATCH.TAIL), it sets its output Q2 high.

When the output of the address decoder 3 goes high and the output Q1 of the tail mark counter 1 goes low, a hold latch 11 is triggered. As a result, the hold latch 11 controls the clock gate 2 to set low the clock pulse input CP of the shift register 12 that includes the address register 4 and the data register 5. Under this condition, since the clock pulse input CP is low, the shift register 12 does not shift the data contained even when the next data is sent in. Hence, the output of the address decoder 3 is kept high.

Whether it receives an independent latch tail LATCH.TAIL or receives the latch tail after data transmission to other addresses, the tail mark counter 1, when it has counted three high-to-low transitions of the data SD (latch tail LATCH.TAIL), drives the clock pulse input CP of the output register 6 and resets the hold latch 11.

Figure 10:
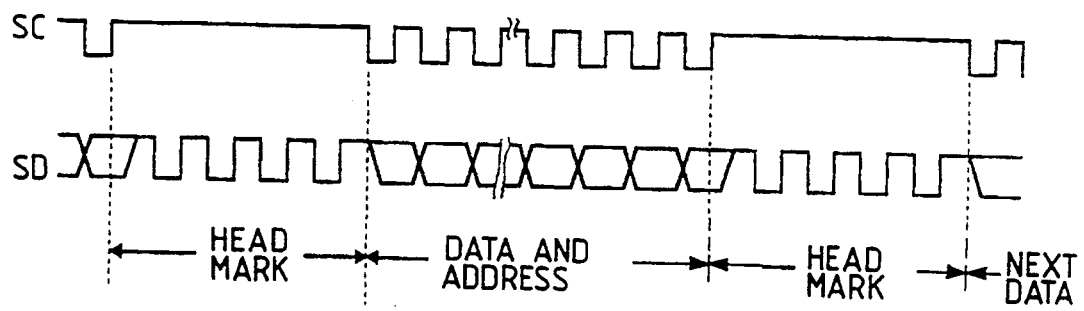
FIG. 10 is a format diagram showing another example of serial data in a communications system embodying this invention.

FIG. 10 shows another example of data format of the communications system according to this invention. Although FIGS. 1 to 9 are shown in relation to the tail mark, the communications system of this invention can also be applied for a head mark. In the communications system shown in FIGS. 1 through 9, the control mark (tail mark) is added after the data string including data and address. Therefore, when there is a large number of bits of data being transferred, the receiving side cannot determine what should be done with its own state until it receives the tail mark. In that case, it is easily expected that the responsiveness of the receiving side will degrade. By putting the head mark MEAD.MARK before the data string to be transferred to the receiving side, as shown in FIG. 10, it is possible to secure a high responsiveness of the receiving side even when the number of data bits is large.

This invention offers the following advantages.

(1) This invention permits simultaneous control of a plurality of receiving stations without requiring a specially high speed of transfer, i.e., by using a relatively slow clock, for example, 500 kHz or lower. Since it is not necessary to consider the sequence of data transfer or interruption of data transfer due to interrupts, the control of a sending station becomes simple.

(2) The communications system of this invention employs a two-line circuit. This reduces the equipped area of the system, contributing to a reduction in the system cost.

(3) Since the bus interface can readily be realized by taking a wired-OR logic of the drains of open-drain MOSFETs of the serial output port and of the general I/O port in a common single-chip microcomputer, no dedicated I/O for the bus of this invention is needed. Further, the input circuit on the receiving station side is simple in configuration and not large in circuit scale. The input circuit on the receiving station side can be formed by as few as 200 gates if, for example, it is constructed of an IIL circuit which has a good affinity with linear circuit.

Representative advantages offered by this invention disclosed in this application are briefly explained below. By sending from the sending station side to the receiving station side standby data (instruction) which requests individual receiving stations to come into a standby mode and execution data (instruction) which requests all the receiving stations to simultaneously enter an execution mode, it is possible to secure the simultaneous operation of all the receiving stations.

This invention is not limited to the above-mentioned embodiments alone but various modifications may be made. For example, the number of high-to-low transitions of the data SD, which defines the number of pulses in the tail mark, is not limited to two or three but may be set to four or five. It is also possible to add different kinds of tail mark. In that case, the configuration of the tail mark counter 1 in FIG. 8 and 9 need be modified.

What is claimed is:

1. A communications apparatus comprising:
    a sending station;
    at least one receiving station;
    a data bus circuit connected between the sending station and the receiving station for transferring a series of data bits from the sending station to the receiving station; and
    a clock bus circuit connected between the sending station and the receiving station for transferring clock signals synchronous with each of the series of data bits from the sending station to the receiving station;
    wherein the sending station also transmits control information for controlling the state of the receiving station onto the data bus circuit while the potential of the signal on the clock bus circuit is fixed by the sending station.

2. A communications apparatus as claimed in claim 1, wherein the control information defines the state of the receiving station by the number of potential transitions on the data bus circuit.

3. A communications apparatus as claimed in claim 2, wherein the receiving station includes a means to recognize the control information.

4. A communications system comprising:
    a plurality of stations interconnected by a two-line circuit, the two-line circuit including: a data bus circuit for transmitting a series of data bits between at least one sending station and receiving stations of the plurality of stations; and a clock bus circuit for transmitting clock signals in synchronism with each of the data bits;
    the sending station also sending control information to the data bus circuit for controlling states of the receiving stations while a logic value of the signal on the clock bus circuit is fixed by the sending station.

5. A communications system as claimed in claim 4, wherein the control information includes a signal which requests the receiving stations to enter either a standby state or an execute state after taking in data included in the series of data bits.

6. A communications system as claimed in claim 5, wherein the sending station transmits the signal to make one of the receiving stations enter the standby state after taking in data included in the series of data bits and then sends another series of data bits to another receiving station, after which the sending station sends a signal to make both the one and the another receiving stations simultaneously enter the execute state.

7. A communications system as claimed in claim 4, wherein the control information is added at the end of a data packet containing the series of data bits.

8. A communications system as claimed in claim 4, wherein the control information is added at the start of a data packet containing the series of data bits.

9. In a serial communications system including at least one sending station and a plurality of receiving stations, a data line connected among the sending and receiving stations, and a clock line connected among the sending and receiving stations, a serial communications method comprising:
    on the data line, sending a serial data string containing data to be transferred from the sending station to a selected one of the receiving stations and an address specifying the selected receiving station, the serial data string consisting of a plurality of data bits;
    from the sending station, sending a clock signal on the clock line in synchronism with each of the plurality of data bits in the serial data string; and
    from the sending station, sending control information on the data line for controlling the state of the selected receiving station, the control information being imposed at one of the beginning or the end of the serial data string and fixing a logic value of the signal on the clock line by the sending station during the sending of the control information.

10. A serial communications method as claimed in claim 9, wherein the control information includes one of (i) a signal requesting the selected receiving station to hold data of the serial data string or (ii) a signal requesting the selected receiving station to execute that data.

11. A system control apparatus comprising:
    a data processing device for performing a system control according to a program;

a two-line circuit consisting of a data bus circuit and a clock bus circuit; and a plurality of control circuits connected to the data processing device by the two-line circuit;

wherein the data processing device sends a signal requesting a standby or an execute state to the control circuits through the data bus circuit while a logic value of the signal on the clock bus circuit is fixed.

12. A communications system comprising:

at least one sending station;

a plurality of receiving stations;

a data line coupled among the sending and receiving stations for transmitting a series of data bits from the sending station to the receiving stations; and a clock line coupled among the sending and receiving stations for transmitting clock signals from the sending station to the receiving stations, the clock signals being synchronous with each of the series of data bits;

wherein the sending station provides control information to the data line for controlling state of the receiving stations while the signal on the clock line is set at a predetermined voltage by the sending station.

13. A communications system according to claim 12, wherein the series of data bits includes: data destined for one of the receiving stations and address data for specifying one of the receiving stations.

14. A communication system according to claim 13, wherein the control information is provided in a pulse signal which is obtained by changing a voltage level of the signal on the data line.

15. A communication system according to claim 14, wherein each of the receiving stations includes a circuit for deriving the control information from the pulse signal.

16. A communication system according to claim 15, wherein each of the receiving stations includes an address decoder for decoding the address data in the series of data bits.

17. A communication system according to claim 12, wherein the control information is at the end of the series of data bits.

18. A serial communication system comprising:

at least one sending station;

a plurality of receiving stations;

a data line coupled among the sending and receiving stations for transmitting a serial data string of a plurality of data bits from the sending station to the receiving stations, the serial data string containing data to be transferred to one of the receiving stations and address data for specifying one of the receiving stations; and a clock line coupled among the sending and receiving stations and for transmitting clock signals from the sending station to the receiving stations, the clock signals being synchronous with each of the plurality of data bits in the serial data string, wherein the sending station also sends control information for controlling states of at least one of the receiving stations, and wherein the control information is positioned at one of (i) preceding or (ii) following the serial data string while a logic value of the signal on the clock line is set at a predetermined level by the sending station.

19. A serial communication system according to claim 18, wherein the sending station includes a microcomputer, and wherein the plurality of receiving stations includes a record signal processing device, a brightness/color processing device, and a servo device for a video tape recorder.

20. A serial communication system according to claim 19, wherein the data to be transferred includes mode control data for the record signal processing device, the brightness/color processing device and the servo device.

21. A method for controlling an operating state of a receiving station with a sending station, the method comprising the steps of:

from the sending station, sending a serial data string which includes a plurality of bits onto a data line and concurrently sending a clock signal which is synchronous with each of the plurality of bits in the serial data string onto a clock line, wherein the serial data string includes address data for specifying the receiving station and data to be transferred to the specified receiving station;

from the sending station, sending control information for requesting one of a standby state or an execute state of the receiving station onto the data line and concurrently fixing a voltage level of the signal on the clock line at a predetermined level;

receiving the serial data string and the control information by the receiving station; and in response to the control information, setting the receiving station to the requested one of the standby or execute states.

22. A method according to claim 21, wherein the step of sending control information includes changing a voltage level of the signal on the data line.

23. In a system comprising a sending station, first and second receiving stations, a data line coupled among the sending station and the first and second receiving stations, and a clock line coupled among the sending station and the first and second receiving stations, a method for controlling operating states of the first and second receiving stations comprising the steps of:

transferring a first serial data string including a plurality of bits onto a data line from the sending station while sending a clock signal which is synchronous with each of the plurality of bits in the first serial data string onto a clock line, wherein the first serial data string includes address data for specifying the first receiving station and data to be transferred to the first receiving station;

sending first control information for requesting one of a standby state or an execute state to the first receiving station form the sending station onto the data line while a voltage level of the signal on the clock line is fixed at a predetermined level by the sending station;

receiving the first serial data string and the first control information at the receiving station;

in response to the control information, setting the first receiving station to the requested one of the standby or executed states;

transferring a second serial data string in a plurality of bits to the data line from the sending station while sending a clock signal which is synchronous with each of the plurality of bits in the second serial data string onto the clock line, wherein the second serial data string includes address data for specifying the second receiving station and data to be transferred to the second receiving station;

sending second control information for requesting one of the standby or execute states to the second receiving station from the sending station on the data line while the voltage level of the signal on the clock line is fixed at the predetermined level by the sending station;

receiving the second serial data string and the second control information at the second receiving station; and in response to the second control information, setting the second receiving station to the requested one of the standby or execute state.

24. A method according to claim 23, wherein the first and second receiving stations enter the execute state simultaneously when the first control information requests the standby state to the first receiving station and the second control information requests the execute state to the second receiving station.

25. A method according to claim 23, wherein each of the step of sending first control information and the step of sending second control information includes a step of changing a voltage level of the signal on the data line.

* * * * *

UNITED STATES PATENT AND TRADEMARK OFFICE
CERTIFICATE OF CORRECTION

PATENT NO. : 5,341,131
DATED : August 23, 1994
INVENTOR(S) : Masakazu Hoshino, et al.

It is certified that error appears in the above-indentified patent and that said Letters Patent is hereby corrected as shown below:

Claim 11, column 11, line 9, after "fixed" insert
--by the sending station--.

Claim 12, column 11, line 22, delete "state" and substitute therefor --states--.

Claim 23, column 12, line 53, delete "form" and substitute therefor --from--.

Claim 24, column 14, line 5, delete "state" and substitute therefor --states--.

Signed and Sealed this

First Day of November, 1994

Attest:

BRUCE LEHMAN

*Attesting Officer*        *Commissioner of Patents and Trademarks*